April 1, 1958  H. J. VOELKER  2,829,057
PIE SHELL PACKAGE
Filed May 12, 1954
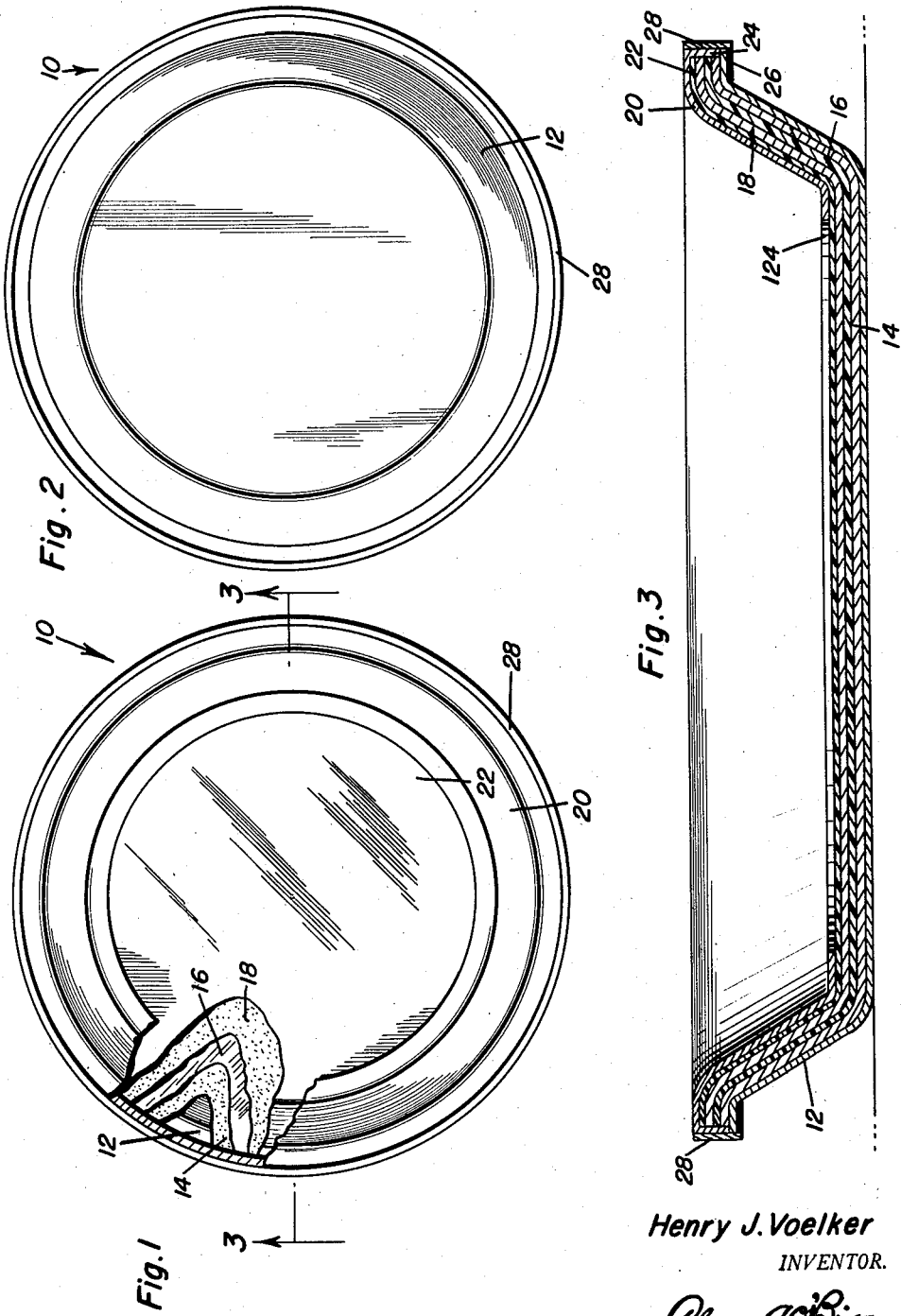
Henry J. Voelker
INVENTOR.

United States Patent Office 2,829,057
Patented Apr. 1, 1958

2,829,057

PIE SHELL PACKAGE

Henry J. Voelker, New Orleans, La.

Application May 12, 1954, Serial No. 429,249

6 Claims. (Cl. 99—172)

The present invention relates to protective cover for pie pans in the packaging of ready-to-bake doughs in such pans.

The primary object of the invention is to provide a protective package for pie doughs wherein the pie dough may be cut to size and placed in the pie pan for distribution and sale and protected and sealed in such pie pan by a novel protective covering which will sealingly enclose the dough in the pie pan.

It is a further object of the invention to provide a top protective covering for an unbaked pie dough disposed in a pie pan, which covering nests within the pie pan and is spaced therefrom to prevent crushing or mutilation of the pie dough within the pie pan.

It is a further object of the invention to provide an unbaked pie dough packaging arrangement whereby no unfolding or handling of the dough is necessary prior to baking, which packaging arrangement enables the potential consumer to see the product prior to buying and which packaging enables the dough to be kept for exceedingly long periods of time under ordinary refrigeration.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of the pie dough packaging arrangement of the present invention with portions of the packaging, dough, and pie plate being broken away to show the packaging layers;

Figure 2 is a bottom view of the pie dough packaging arrangement; and

Figure 3 is a cross-sectional view of the pie dough packaging arrangement taken substantially along the plane of section line 3—3 of Figure 1.

In the drawings, the pie dough packaging arrangement is designated in its entirety by the numeral 10, the arrangement being such that the unbaked pie doughs are disposed within the pie pans and are protectively covered in such pans for the subsequent distribution and sale to potential consumers whereby it is necessary only to remove the protective cover to bake the dough in the pie pan without any handling, rolling, or change of position of the pie dough.

In carrying out the invention, the packaging consists primarily of a suitable pie pan 12. Into this pie pan a pie dough which has been rolled, cut to shape, size and thickness, is placed in its unbaked condition into the pie pan to conform to the shape of the pie pan as is customary prior to baking, this dough being indicated by the numeral 14.

On top of this first dough layer 14 is placed a non-absorptive, separating layer of wax paper, cellophane, or the like, 16.

On top of the non-absorptive separating layer 16 is disposed a second layer of dough which has been rolled and cut to size, being designated by the numeral 18. This second layer of dough constitutes the top crust of the pie when the pie is to be baked.

On top of the second layer of dough 18 is a rigid, protective cover 20 shaped to the contour of the pie pan and nesting within the pie pan overlying the second layer of dough.

To the undersurface of the protective cover 20 is secured in a suitable manner a layer of cellophane or other non-absorptive material 22 which will not adhere to the pie dough.

Preferably, the material 22 is transparent and the bottom of the rigid protective cover 20 has a circular cut-out portion 124 on the bottom thereof exposing the undersurface layer 22 so that the top layer of the pie dough 18 may be viewed or visually observed through this cut-away opening in the protective cover.

Adjacent the rim thereof, the protective cover 20 is provided with a rigid, spacing means in the form of the downturned flange or rim 24 which abuts the rim 26 of the pie pan and spaces the protective cover 20 from the pie pan 12 to a distance approximately equal to the thickness of the pie crust and protects the layers of dough from crushing or other mutilation, thereby permitting the nesting of the pie dough packages one within the other for shipment, display or storage.

In order to sealingly attach the cover 20 to the pie pan 12, sealing tape 28 may extend around the mating rim portions of the cover 20 and the pie pan rim 26 and adhesively secure or attach these rims to one another.

In the construction and packaging arrangement shown, both the under crust and the upper crust doughs of the pie are shown as being packaged in the pie pan and beneath the protective cover. However, only a single layer such as the under crust 14 may be packaged in this manner if desired. Likewise, the particular rim construction of the cover 20 is simply one means of spacing the cover from the pie pan and it is to be understood that a beaded or rolled rim would serve the same effect.

In place of the tape 28 to sealingly attach the cover on the pie pan 12, to protect the dough layers 14 and 18, a cellophane or other shell may be provided on the exterior of the pie pan over the pie pan bottom and being secured at its edges to the cover 20 to accomplish the attaching and sealing functions necessary in the proper protection and sanitary packaging of the pie doughs.

The protective packages may be made in any size or shape.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with a pie pan having an unbaked pie dough crust disposed therein for baking, a cover nesting in said pie pan and overlying the pie crust, said cover being relatively rigid, means consisting of a flange at the outer edges of said pan and said cover for spacing said cover from said pie pan approximately the thickness of the pie crust, and means releasably sealingly attaching said cover to said pie pan, said pie pan and cover having contiguous rims, said sealingly attaching means being attached to said rims.

2. In combination with a pie pan having an unbaked pie dough crust disposed therein for baking, a protective package comprising a cover nesting in said pie pan and overlying the pie crust, said cover being relatively rigid, means at the outer edges of said cover and said pan spacing said cover from said pie pan approximately the thickness of the pie crust, and means connected to said edges releasably sealingly attaching said cover to said pie pan, said cover having a transparent window therein for visual inspection of the pie crust.

3. In combination with a pie pan having an unbaked pie dough crust disposed therein for baking, a cover nesting in said pie pan and overlying the pie crust, said cover being relatively rigid, means spacing said cover from said pie pan approximately the thickness of the pie crust, and means releasably sealingly attaching said cover to said pie pan, said pie pan and cover having contiguous rims, said sealingly attaching means being attached to said rims, said spacing means comprising a portion of said cover and abutting the rim of said pie pan.

4. In combination with a pie pan having an unbaked pie dough crust disposed therein for baking, a cover nesting in said pie pan and overlying the pie crust, said cover being relatively rigid, means spacing said cover from said pie pan approximately the thickness of the pie crust, and means releasably sealingly attaching said cover to said pie pan, said pie pan and cover having contiguous rims, said sealingly attaching means being attached to said rims, said spacing means comprising a portion of said cover abutting the rim of said pie pan, said cover having a transparent window therein.

5. In combination with a pie pan having an unbaked pie dough crust disposed therein for baking, a cover nesting in said pie pan and overlying the pie crust, said cover being relatively rigid, means connected with said cover for spacing said cover from said pie pan approximately the thickness of the pie crust, means releasably sealingly attaching said cover to said pie pan, said pie pan and cover having contiguous rims, said sealingly attaching means being attached to said rims, said spacing means comprising a portion of said cover abutting the rim of said pie pan, said cover having a non-absorptive undersurface material thereon for preventing moisture absorption from the pie dough, and a transparent window formed by said undersurface material.

6. The combination of claim 2 wherein said pie pan has a second unbaked pie dough crust disposed therein, and a spacer between the first mentioned and said second pie dough, said means at the outer edges of said cover which space said cover from said pie pan extending along the outer edges of said first mentioned pie dough and said second pie dough.

References Cited in the file of this patent

UNITED STATES PATENTS

| | | |
|---|---|---|
| 730,082 | Bates | June 2, 1903 |
| 1,446,782 | Broun et al. | Feb. 27, 1923 |
| 2,041,537 | Frost | May 19, 1936 |
| 2,042,070 | McCaskell | May 26, 1936 |
| 2,080,125 | Frost | May 11, 1937 |
| 2,135,342 | Jackson | Nov. 1, 1938 |
| 2,174,425 | Schlumbohm | Sept. 26, 1939 |
| 2,309,557 | Watkins | Jan. 26, 1943 |
| 2,316,574 | Ehrlich | Apr. 13, 1943 |
| 2,550,815 | Inwood | May 1, 1951 |
| 2,555,033 | Harris | May 29, 1951 |
| 2,691,337 | Forrest | Oct. 12, 1954 |